United States Patent
Gonion

(10) Patent No.: US 9,928,069 B2
(45) Date of Patent: *Mar. 27, 2018

(54) PREDICATED VECTOR HAZARD CHECK INSTRUCTION

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 818 days.

This patent is subject to a terminal disclaimer.

(21) Appl. No.: 14/137,232

(22) Filed: Dec. 20, 2013

(65) Prior Publication Data

US 2015/0178087 A1 Jun. 25, 2015

(51) Int. Cl.
| | | |
|---|---|---|
| *G06F 15/00* | (2006.01) | |
| *G06F 9/30* | (2006.01) | |
| *G06F 9/40* | (2006.01) | |
| *G06F 9/38* | (2018.01) | |

(52) U.S. Cl.
CPC ........ *G06F 9/3838* (2013.01); *G06F 9/30018* (2013.01); *G06F 9/30036* (2013.01); *G06F 9/30076* (2013.01)

(58) Field of Classification Search
None
See application file for complete search history.

(56) References Cited

U.S. PATENT DOCUMENTS

| | | |
|---|---|---|
| 5,261,113 A | 11/1993 | Jouppi |
| 6,009,512 A | 12/1999 | Christie |
| 6,513,110 B1 | 1/2003 | Keppel et al. |
| 6,604,192 B1 | 8/2003 | Arnold |
| 6,622,238 B1 | 9/2003 | Benjamin |
| 7,219,212 B1 | 5/2007 | Sanghavi |
| 7,395,419 B1 | 7/2008 | Gonion |
| 7,617,496 B2 | 11/2009 | Gonion |
| 7,620,797 B2 | 11/2009 | Gonion et al. |
| 7,624,251 B2 | 11/2009 | Gonion et al. |
| 7,739,442 B2 | 6/2010 | Gonion |
| 7,975,134 B2 | 7/2011 | Gonion |

(Continued)

OTHER PUBLICATIONS

Jansen (GPU++ An Embedded GPU Development System for General-Purpose Computations, Sep. 2007, pp. 1-118).*

(Continued)

*Primary Examiner* — George Giroux
(74) *Attorney, Agent, or Firm* — Meyertons, Hood, Kivlin, Kowert & Goetzel, P.C.; Lawrence J. Merkel

(57) ABSTRACT

A hazard check instruction has operands that specify addresses of vector elements to be read by first and second vector memory operations. The hazard check instruction outputs a dependency vector identifying, for each element position of the first vector corresponding to the first vector memory operation, which element position of the second vector that the element of the first vector depends on (if any). In an embodiment, the addresses of the vector memory operations are specified using a base address for each vector memory operation and a vector that is shared by both vector memory operations. In an embodiment, the operands may include predicates for one or both of the vector memory operations, indicating which vector elements are active. The dependency vector may be qualified by the predicates, indicating dependencies only for active elements.

20 Claims, 9 Drawing Sheets

(56) References Cited

U.S. PATENT DOCUMENTS

| | | |
|---|---|---|
| 8,019,976 B2 | 9/2011 | Gonion et al. |
| 8,019,977 B2 | 9/2011 | Gonion et al. |
| 8,060,728 B2 | 11/2011 | Gonion et al. |
| 8,078,847 B2 | 12/2011 | Gonion et al. |
| 8,131,979 B2 | 3/2012 | Gonion et al. |
| 8,176,299 B2 | 5/2012 | Gonion et al. |
| 8,181,001 B2 | 5/2012 | Gonion et al. |
| 8,271,832 B2 | 9/2012 | Gonion et al. |
| 8,356,159 B2 | 1/2013 | Gonion et al. |
| 8,356,164 B2 | 1/2013 | Gonion et al. |
| 8,359,460 B2 | 1/2013 | Gonion et al. |
| 8,359,461 B2 | 1/2013 | Gonion et al. |
| 8,364,938 B2 | 1/2013 | Gonion et al. |
| 8,370,608 B2 | 2/2013 | Gonion et al. |
| 8,402,255 B2 | 3/2013 | Gonion et al. |
| 8,412,914 B2 | 4/2013 | Gonion |
| 8,417,921 B2 | 4/2013 | Gonion et al. |
| 8,447,956 B2 | 5/2013 | Gonion et al. |
| 8,464,031 B2 | 6/2013 | Gonion |
| 8,484,443 B2 | 7/2013 | Gonion |
| 8,504,806 B2 | 8/2013 | Gonion |
| 8,527,737 B2 | 9/2013 | Gonion |
| 8,527,742 B2 | 9/2013 | Gonion |
| 8,539,205 B2 | 9/2013 | Gonion |
| 9,317,284 B2 * | 4/2016 | Gonion .............. G06F 9/30036 |
| 9,600,280 B2 | 3/2017 | Gonion |
| 2010/0042789 A1 * | 2/2010 | Gonion ................ G06F 8/4441 |
| | | 711/154 |
| 2012/0198178 A1 | 8/2012 | Cox |
| 2013/0173886 A1 | 7/2013 | Dockser |
| 2013/0339670 A1 | 12/2013 | Busaba |

OTHER PUBLICATIONS

U.S. Appl. No. 14/034,651, filed Sep. 24, 2013, Jeffry E. Gonion.
Office Action, U.S. Appl. No. 14/034,651, Jeffry E Gonion, filed Sep. 24, 2013; dated Mar. 10, 2016, 34 pages.

* cited by examiner

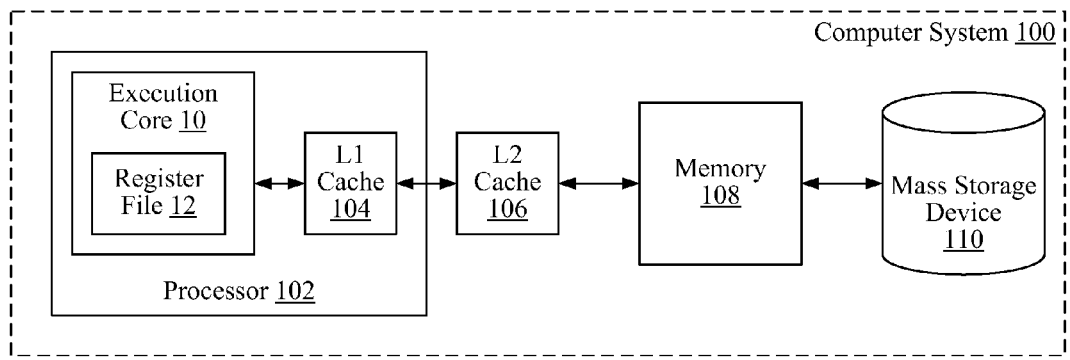
Fig. 1
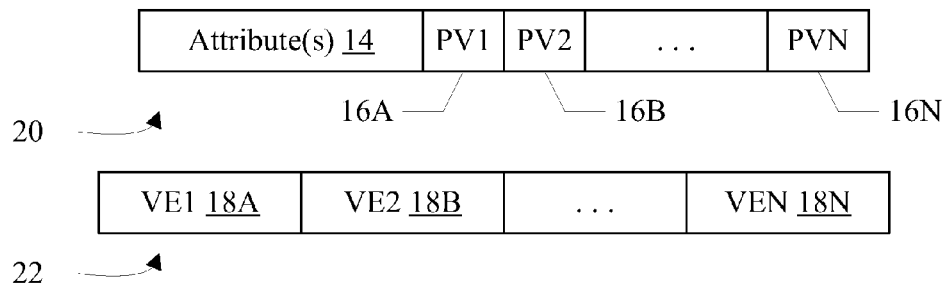
Fig. 2
Dest=HazardCheck(ba1, ba2, v, [p2], [p1])
Fig. 3

| x = 0,  | A[x] = 1,   | r = 1,  | s = 0,  | B[x] = 1  |
| x = 1,  | A[x] = 10,  | r = 1,  | s = 16, | B[x] = 17 |
| x = 2,  | A[x] = 16,  | r = 1,  | s = 16, | B[x] = 17 |
| x = 3,  | A[x] = 16,  | r = 1,  | s = 26, | B[x] = 27 |
| x = 4,  | A[x] = 26,  | r = 1,  | s = 29, | B[x] = 30 |
| x = 5,  | A[x] = 29,  | r = 1,  | s = 9,  | B[x] = 10 |
| x = 7,  | A[x] = 9,   | r = 13, | s = 9,  | B[x] = 22 |
| x = 7,  | A[x] = 1,   | r = 0,  | s = 9,  | B[x] = 9  |
| x = 8,  | A[x] = 20,  | r = 0,  | s = 20, | B[x] = 20 |
| x = 9,  | A[x] = 0,   | r = 17, | s = 20, | B[x] = 37 |
| x = 10, | A[x] = 16,  | r = 17, | s = 9,  | B[x] = 26 |
| x = 11, | A[x] = 14,  | r = 17, | s = 1,  | B[x] = 18 |
| x = 12, | A[x] = 20,  | r = 17, | s = 17, | B[x] = 34 |
| x = 13, | A[x] = 14,  | r = 17, | s = 19, | B[x] = 36 |
| x = 14, | A[x] = 22,  | r = 17, | s = 15, | B[x] = 32 |
| x = 15, | A[x] = 13,  | r = 17, | s = 30, | B[x] = 47 |

Fig. 8A

| x =        | 0  | 1  | 2  | 3  | 4  | 5  | 6  | 7  |
|---|---|---|---|---|---|---|---|---|
| A[x] =     | 1  | 10 | 16 | 16 | 26 | 29 | 9  | 1  |
| r = A[x+s] = | 1  |    |    |    |    |    |    |    |
| s = A[x+r] = |    | 16 | 16 | 26 | 29 | 9  |    |    |
| r = A[x+s] = |    |    |    |    |    |    | 13 | 0  |
| B[x] =     | 1  | 17 | 17 | 27 | 30 | 10 | 22 | 9  |

| x =        | 8  | 9  | 10 | 11 | 12 | 13 | 14 | 15 |
|---|---|---|---|---|---|---|---|---|
| A[x] =     | 20 | 0  | 16 | 14 | 20 | 14 | 22 | 13 |
| s = A[x+r] = | 20 |    |    |    |    |    |    |    |
| r = A[x+s] = |    | 17 |    |    |    |    |    |    |
| s = A[x+r] = |    |    | 9  | 1  | 17 | 19 | 15 | 30 |
| B[x] =     | 20 | 37 | 26 | 18 | 34 | 36 | 32 | 47 |

Fig. 8B

Source Code

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

Fig. 9A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

Fig. 9B

Example 2A
Vectorized
(Non-Speculative)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

Fig. 10A

Example 2B
Vectorized
(Speculative)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

Fig. 10B

Example 3
Vectorized

```
        x = VectorIndex (0,1) ;
        goto Loop1Tail ;
Loop1:
    ~p0; r = VectorReadInt(C,x);
    ~p0; s = VectorReadInt (D, x) ;
    i1 = CheckHazardP(r,x,p0);
    i2 = CheckHazardP(s,x,p0);
    i3 = VectorMax(i1,i2);
    p4 = 0 ;
Loop2:
    ~p0; p4 = GeneratePredicates (p4, i3) ;
    ~p4; t1 = VectorReadInt(A,r) ;
    ~p4; t2 = VectorReadInt(A,s);
    ~p4; t3 = t1 + t2 ;
    ~p4; VectorWriteInt(A,x,t3);
    ~p0; if (!CARRY( )) goto Loop2;
    x += VECLEN;
Loop1Tail:
    p0 = (x < KSIZE) ;
    if ( FIRST (p0) ) goto Loop1 ;
```

Fig. 11

Example 4
Vectorized

```
        x = VectorIndex (0,1) ;
        goto Loop1Tail ;
Loop1:
        j = PropagatePriorF(j,p0);
        ~p0; f = VectorReadInt(A,x);
        ~p0; g = VectorReadInt (B, x) ;
        !p0; p1 = (f < FACTOR);
        !p0; p2 = (g < FACTOR);
        ~p1; h = VectorReadInt(C,x);
        ~p2; i = VectorReadInt(D,x);
        !p1; ix = CheckHazardP(h,i,p2);
        p3 = 0 ;
Loop2:
        p3 = GeneratePredicates (p3, ix) ;
        !p3; p4 = p1 + 0;
        !p3; p5 = p2 + 0;
        ~p4; j = VectorReadInt(E,h);
        j = CopyPropagate(j,j,p4);
        ~p5; VectorWriteInt(E,i,j);
        ~p0; if (!LAST(p3)) goto Loop2;
        x += VECLEN;
Loop1Tail:
        p0 = (x < KSIZE) ;
        if ( FIRST (p0) ) goto Loop1 ;
```

Fig. 12

PREDICATED VECTOR HAZARD CHECK INSTRUCTION

BACKGROUND

Field of the Invention

This invention is related to the field of processors and, more particularly, to processors that execute predicated vector operations.

Description of the Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. For example, in the case of possible memory dependencies, the existence of dependencies cannot be fully resolved because the addresses are not known. Because the compiler cannot conclusively determine that runtime dependencies will not be encountered, the compiler cannot vectorize the loop.

SUMMARY

In an embodiment, a processor may implement a vector instruction set including hazard check instructions. The hazard check instructions have operands that specify addresses of vector elements to be read by first and second vector memory operations, where the first vector memory operation occurs prior to the second vector memory operation in program order. The hazard check instruction outputs a dependency vector identifying, for each element position of the first vector corresponding to the first vector memory operation, which element position of the second vector that the element of the first vector depends on (if any). The dependency vector may be used to control execution of the loop, using predication on the vector operations (derived from the dependency vector) to ensure that dependencies are respected while maximizing the available parallelism. In an embodiment, the addresses of the vector memory operations are specified using a base address for each vector memory operation and a vector that is shared by both vector memory operations. In one embodiment, the elements of the vector may be offsets to the base address, and may be scaled by the data size for each vector memory operation. The scaled offsets, if added to the respective base address, yield the addresses of the elements of the respective vector memory operation. In an embodiment, the operands may include predicates for one or both of the vector memory operations, indicating which vector elements are active. The dependency vector may be qualified by the predicates, indicating dependencies only for active elements.

BRIEF DESCRIPTION OF THE DRAWINGS

The following detailed description makes reference to the accompanying drawings, which are now briefly described.

FIG. 1 is a block diagram of one embodiment of a computer system.

FIG. 2 is a block diagram of one embodiment of a predicate vector register and a vector register.

FIG. 3 illustrates an embodiment of a hazard check instruction.

FIG. 8A is a diagram illustrating a sequence of variable states during scalar execution of the loop shown in Example 1.

FIG. 8B is a diagram illustrating a progression of execution for Macroscalar vectorized program code of the loop of Example 1.

FIG. 9A and FIG. 9B are diagrams illustrating one embodiment of the vectorization of program source code.

FIG. 10A is a diagram illustrating one embodiment of non-speculative vectorized program code.

FIG. 10B is a diagram illustrating another embodiment of speculative vectorized program code.

FIG. 11 is a diagram illustrating one embodiment of vectorized program code.

FIG. 12 is a diagram illustrating another embodiment of vectorized program code.

Figure 4:
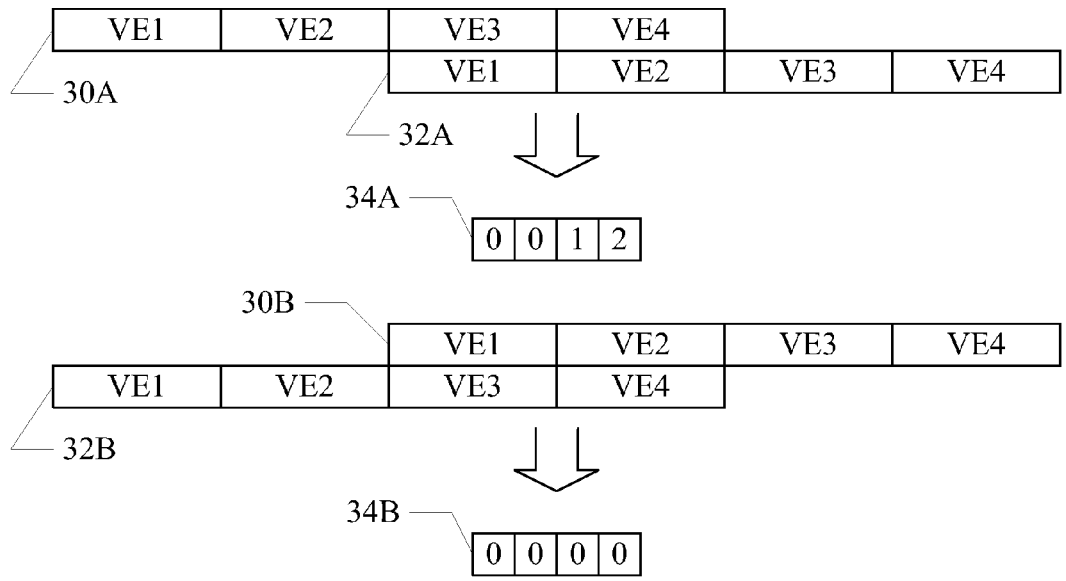
FIG. 4 is a block diagram illustrating vector overlap and dependency.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104 and an execution core 10 coupled to the L1 cache 104. The execution core 10 includes a register file 12 as shown. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Multiple processors similar to the processor 102 may be included. Additionally, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, the processor 102 may be representative of a general-purpose processor that performs computational operations. For example, the processor 102 may be a central processing unit (CPU) such as a microprocessor, a microcontroller, an application-specific integrated circuit (ASIC), or a field-programmable gate array (FPGA). The processor 102 may include one or more mechanisms for vector processing (e.g., vector execution units). The processor 102 may be a standalone component, or may be integrated onto an integrated circuit with other components (e.g. other processors, or other components in a system on a chip (SOC)). The processor 102 may be a component in a multichip module (MCM) with other components.

More particularly, as illustrated in FIG. 1, the processor 102 may include the execution core 10. The execution core 10 may be configured to execute instructions defined in an instruction set architecture implemented by the processor 102. The execution core 10 may have any microarchitectural features and implementation features, as desired. For example, the execution core 10 may include superscalar or scalar implementations. The execution core 10 may include in-order or out-of-order implementations, and speculative or non-speculative implementations. The execution core 10 may include any combination of the above features. The implementations may include microcode, in some embodiments. The execution core 10 may include a variety of execution units, each execution unit configured to execute operations of various types (e.g. integer, floating point, vector, multimedia, load/store, etc.). The execution core 10 may include different numbers pipeline stages and various other performance-enhancing features such as branch prediction. The execution core 10 may include one or more of instruction decode units, schedulers or reservations stations, reorder buffers, memory management units, I/O interfaces, etc.

The register file 12 may include a set of registers that may be used to store operands for various instructions. The register file 12 may include registers of various types, based on the type of operand the execution core 10 is configured to store in the registers (e.g. integer, floating point, multimedia, vector, etc.). The register file 12 may include architected registers (i.e. those registers that are specified in the instruction set architecture implemented by the processor 102). Alternatively or in addition, the register file 12 may include physical registers (e.g. if register renaming is implemented in the execution core 10).

The L1 cache 104 may be illustrative of any caching structure. For example, the L1 cache 104 may be implemented as a Harvard architecture (separate instruction cache for instruction fetching by the fetch unit 201 and data cache for data read/write by execution units for memory-referencing ops), as a shared instruction and data cache, etc. In some embodiments, load/store execution units may be provided to execute the memory-referencing ops.

An instruction may be an executable entity defined in an instruction set architecture implemented by the processor 102. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 102. Some instructions may be microcoded, in some embodiments. Accordingly, the term "instruction operation" may be used herein to refer to an operation that an execution unit in the processor 102/execution core 10 is configured to execute as a single entity. Instructions may have a one to one correspondence with instruction operations, and in some cases an instruction operation may be an instruction (possibly modified in form internal to the processor 102/execution core 10). Instructions may also have a one to more than one (one to many) correspondence with instruction operations. An instruction operation may be more briefly referred to herein as an "op."

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

As mentioned above, the execution core 10 may be configured to execute vector instructions. The vector instructions may be defined as single instruction-multiple-data (SIMD) instructions in the classical sense, in that they may define the same operation to be performed on multiple data elements in parallel. The data elements operated upon by an instance of an instruction may be referred to as a vector. However, it is noted that in some embodiments, the vector instructions described herein may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.).

In one embodiment, the register file 12 may include vector registers that can hold operand vectors and result vectors. In some embodiments, there may be 32 vector registers in the vector register file, and each vector register may include 128 bits. However, in alternative embodiments, there may be different numbers of vector registers and/or different numbers of bits per register. The vector registers may further include predicate vector registers that may store predicates for the vector instructions, and may also store one or more vector attributes as described in further detail below. Furthermore, embodiments which implement register renaming may include any number of physical registers that may be allocated to architected vector registers and architected predicate vector registers. Architected registers may be registers that are specifiable as operands in vector instructions.

In one embodiment, the processor 102 may support vectors that hold N data elements (e.g., bytes, words, doublewords, etc.), where N may be any positive whole number. In these embodiments, the processor 102 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of the processor 102.

In some embodiments, as described in greater detail below, based on the values contained in a vector of predicates or one or more scalar predicates, the processor 102 applies vector operations to selected vector data elements only. In some embodiments, the remaining data elements in a result vector remain unaffected (which may also be referred to as "masking" or "masking predication") or are forced to zero (which may also be referred to as "zeroing" or "zeroing predication"). In some embodiments, the clocks for the data element processing subsystems ("lanes") that are unused due to masking or zeroing in the processor 102 can be power and/or clock-gated, thereby reducing dynamic power consumption in the processor 102. Generally a predicate may refer to a value that indicates whether or not an operation is to be applied to a corresponding operand value to produce a result. A predicate may, e.g., be a bit indicating that the operation is to be applied in one state and not applied in the other state. For example, the set state may indicate that the operation is to be applied and the clear state may indicate that the operation is not to be applied (or vice versa). A vector element to which the operation is to be applied as indicated in the predicate is referred to as an active vector element. A vector element to which the operation is not to be applied as indicated in the predicate is referred to as an inactive vector element.

In various embodiments, the architecture may be vector-length agnostic to allow it to adapt to parallelism at runtime. More particularly, when instructions or ops are vector-length agnostic, the operation may be executed using vectors of any length. A given implementation of the supporting hardware may define the maximum length for that implementation. For example, in embodiments in which the vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware. In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

While the instruction set architecture may specify that vector instructions are vector length agnostic, vector attributes may be useful to the vector hardware. In an embodiment, the predicate vector registers may store both the predicates and one or more vector attributes for the corresponding vector operation. The vector attribute may generally specify any architected and/or implementation-specific size information. For example, in an embodiment, vector attributes may specify at least one of a vector element size (specifying one of a set of supported vector element sizes for a particular operation), vector size (e.g. size of the vector registers, e.g. in bits or bytes), number of vector elements per vector, number of elements per partition, number of partitions per vector, or partition size. A partition may be a subset of a vector on which certain operations are defined to operate. For example, a vector operation that reverses the order of the vector elements may operate on partitions within the vector register, reversing the order within each partition.

In an embodiment, the predicate vector registers may be architected to store one or more vector attributes, and the vector registers may store vector elements (N elements, where N is implementation-specific). FIG. 2 is a block diagram illustrating an exemplary predicate vector register 20 and an exemplary vector register 22 as architected according to one embodiment of the instruction set architecture implemented by the processor 102. As illustrated in FIG. 2, the predicate vector register 20 includes an attributes field 14 and N predicate fields 16A-16N. The N predicate fields correspond to the N vector element fields 18A-18N of the vector register 22.

Some vector instructions may explicitly define vector attributes. That is, the encoding of the instruction itself (e.g. the opcode, one or more other fields of the instruction such as an immediate field, etc.) may specify the vector attribute. For example, an embodiment includes predicate vector initialization instructions, which are defined to initialize predicate vector registers with true predicates (predicates which cause the corresponding vector elements to be operated upon, e.g. the set state) or false predicates (predicates which cause the corresponding vector elements to not be operated upon, e.g. the clear state). The predicate vector initialization instructions may also explicitly specify the vector attributes. In an embodiment, memory-referencing instructions may explicitly specify vector attributes. Memory-referencing instructions may include loads (which read data from memory into registers, although the read may be accomplished in cache) and stores (which write data from registers to memory, although the write may be accomplished in cache). Since the vector attributes may affect the amount of memory that is read/written (e.g. the number of consecutive bytes at each vector location), the memory-referencing instructions may explicitly identify the vector attributes.

The memory-referencing instructions may include vector memory operations (vector loads and vector stores). The vector load memory operation may read a vector from memory into a vector register, and the vector store memory operation may write a vector from a vector register to memory. In various embodiments, the source operands of the vector memory operations may specify memory locations of the vector elements. In an embodiment, the source operands may include a base address and a vector. A vector of addresses may be generated responsive to the base address and the elements of the vector. Each vector element may specify an offset from the base address to a corresponding element of the vector memory operation. The vector elements of the source vector operand may be scaled by a data size of the vector memory operation, and scaled vector element (scaled offset) may be added to the base address to locate the corresponding element of the vector memory operation.

Since the addresses of vector elements are generated at runtime, it may not be possible for the compiler to disambiguate the memory references and ensure that there are no dependencies between vector memory operations. More particularly, the vectorization of a loop may include a first memory operation followed by a second memory operation in the loop. The vector elements of the second memory operation may, in the original scalar code sequence, occur prior to the vector elements of the first memory operation that occur in later iterations of the loop. For example, if the second memory operation writes a location in one iteration of a loop and the first memory operation reads that same location in a later iteration of the loop, the vector element in the first vector depends on the earlier vector element of the second vector. If the first vector memory operation were simply executed, however, the dependency would not be respected and incorrect results would occur.

The instruction set architecture implemented by the processor 102 may include hazard check instructions to permit detection of memory reference dependencies for vector memory operations. The hazard check instructions may have a variety of forms, supporting the addressing options for the vector memory operations. FIG. 3 is a diagram illustrating a form of the hazard check instruction for one embodiment, illustrating in C/C++ pseudocode. The hazard check instruction may include multiple source operands that specify the addresses of the first vector memory operation (in program order) to be checked against the second vector memory operation (in program order). The result of the check may be a dependency vector written to the destination (Dest in FIG. 3). The dependency vector may include a vector element for each vector position of a first vector corresponding to the first vector memory operation. The vector element may indicate whether or not there is a dependency of the first vector on a second vector corresponding to the second vector memory operation and, if so, which vector element of the second vector the first element depends on. In one embodiment, the element positions may be numbered 1 to N, where N is the number of vector elements, and the indication may be a zero to indicate no dependency or a non-zero integer between 1 and N based on the position of the dependency. Other dependency vectors may indicate dependencies in other fashions (e.g. a valid bit and element position, relative element position, etc.).

In the illustrated embodiment, the hazard check instruction receives two base addresses, each base address corresponding to one of the vector memory operations (ba1 and ba2), and a vector having elements that define the offsets to vector elements of the vector operations (v). The hazard check instruction may also optionally receive a predicate operand corresponding to the second vector memory operation (p2). If the predicate operation p2 is received, dependencies may only be detected on elements of the second vector if the elements are active as indicated in the predicate. Similarly, some embodiments may include a second predicate corresponding to the first vector memory operation (p1). Dependencies may only be indicated for elements of the first vector that are active as indicated in the predicate. Alternatively, the hazard check instruction may be predicated with p1.

The resulting dependency vector may be used to generate predicates for the other instructions within the loop (e.g. the first and second vector memory operations). The dependency vector and corresponding predicates may ensure that the memory dependencies are respected in the vector loop while still permitting parallel vector operations where possible.

FIG. 4 is a block diagram illustrating examples of dependency checking between a first vector 30 corresponding to a first vector memory operation and a second vector 32 corresponding to a second vector memory operation that follows the first vector memory operation in program order. For clarity, a letter is appended to each reference numeral 30, 32, and 34 in FIG. 4 to differentiate the two examples. The vector elements of the vectors 30 and 32 may be in the same memory location if they are vertically aligned in FIG. 4. Accordingly, in the first example at the top of FIG. 4, vectors elements 3 and 4 (VE3 and VE4) of the first vector 30A are in the same memory locations as vector elements 1 and 2 (VE1 and VE2) of the second vector 32A, respectively. The vector elements are numbered in the order that they would occur in a scalar code sequence (e.g. VE1 is before VE2, VE2 is before VE3, etc.)

In the first example, VE3 and VE4 of the first vector 30A overlap with VE1 and VE2 of the second vector 32A, respectively. Because VE1 and VE2 are ordered before VE3 and VE4, there is a dependency of VE3 of the first vector 30A on VE1 of the second vector 32A and VE4 of the first vector 30A on VE2 of the second vector 32A. A vector memory operation that concurrently reads or writes the VE1 to VE4 of the first vector 32A would violate the dependency on VE1 and VE2 of the second vector 32A. Accordingly, a resulting dependency vector 34A for a hazard check instruction in this example includes position 1 in position 3 of the dependency vector and position 2 in position 4 of the dependency vector. Viewed in another way, vector element 3 of the first vector 30A depends on vector element 1 of the second vector 32A and vector element 4 of the first vector 30A depends on vector element 2 of the second vector 32A.

In the second example of FIG. 4, the reverse situation is illustrated in which VE1 and VE2 of the first vector 30B overlap with VE3 and VE4 of the second vector 32B. Because the second vector memory operation of VE3 and VE4 occurs after the first vector memory operation in program order and the memory operations for VE3 and V4 of the second vector memory operation logically occur after VE1 and VE2 of the first vector memory operation, no dependencies are detected. Accordingly, the resulting dependency vector 34B in the second example indicates no dependencies (all zeros in the dependency vector).

The examples illustrate vector elements that are stored in consecutive memory locations. However, since the vector specifies the offsets to the various vector elements of the vector memory operations, the vector elements need not be stored in the consecutive memory locations. That is, the vector elements may be scattered about memory. Nevertheless, dependencies may still be determined because the addresses are ordered via the vector, and thus the order of element access may be identified even though the elements are dispersed in memory.

Figure 5:
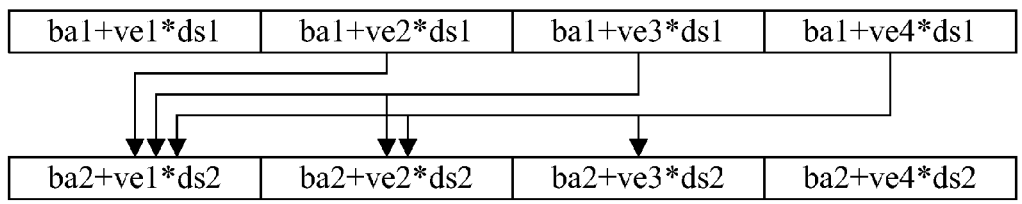
FIG. 5 is a block diagram illustrating dependency comparisons for an embodiment of the hazard check instruction.

As mentioned above, the order of the addresses within the vector of addresses (or the order of the vector elements within an address range, for a scalar address) may permit detection of dependencies between the first and second vector. Logically, the address of a given element position of the first vector may be compared to the address for each preceding element position of the second vector. FIG. 5 illustrates the comparison with arrows from the first vector positions (top of example) and the preceding element positions of the second vector (bottom of example). The address of each element may be the base address for the corresponding vector memory operation (ba1 or ba2) plus the vector element of the source vector v for that position of the vector memory operation (ve1 to ve4) scaled (e.g. multiplied) by a data size of the vector memory operation (ds1 or ds2).

The data size of each vector memory operation may be specified in a variety of fashions, in various embodiments. There may be variants of the hazard check instruction for each supported data size (or combination of data sizes between the first and second vector memory operations) for example. If predicates are specified, the attribute from the predicate vector register(s) may be used. In other embodiments, the data sizes may be specified via another operand of the hazard check instruction.

While FIGS. 4 and 5 use four elements per vector as an example, any number of vector elements may be used in a given implementation.

Figure 6:
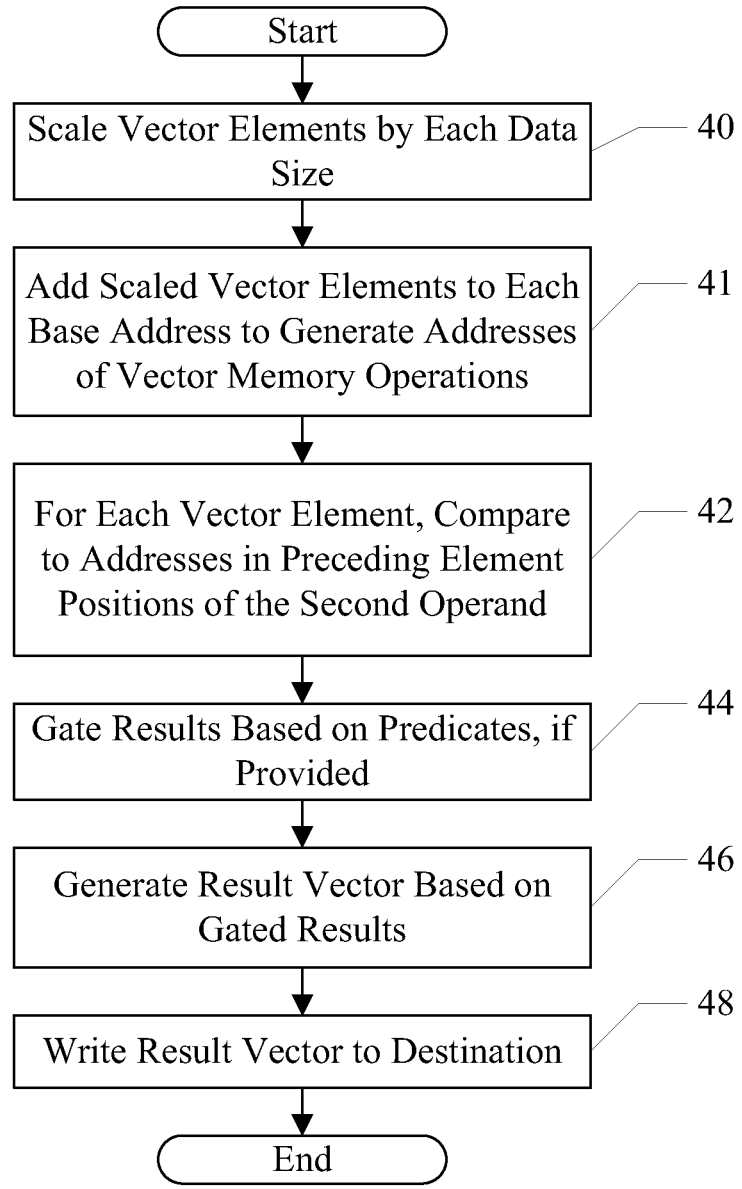
FIG. 6 is a flowchart illustrating operation of one embodiment of a processor that implements a hazard check instruction.

Turning now to FIG. 6, a flowchart is shown illustrating operation of one embodiment of the processor 102/execution core 10 in response to a hazard check instruction. While the blocks are shown in a particular order for ease of understanding, other orders may be used. Blocks may be performed in parallel in combinatorial logic in the processor 102/execution core 10. Blocks, combinations of blocks, and/or the flowchart as a whole may be pipelined over multiple clock cycles in the processor 102/execution core 10.

The processor 102/execution core 10 may be configured to scale the vector elements of the vector operand by the data size of each vector memory operation (block 40). The processor 102/execution core 10 may be configured to add the scaled vector elements to each base address, generating a vector of addresses corresponding to the first vector memory operation (based on the first base address) and the second vector memory operation (based on the second base address) (block 41). For each vector element in the first vector corresponding to the first vector memory operation associated with the hazard check instruction, the processor 102/execution core 10 may be configured to compare the address of the vector element to addresses of preceding elements of the second vector memory operation (block 42). If there are any matches, a dependency may be detected. If there is more than one match for a given first vector element, the match "nearest" the first vector element, in terms of position, may be used. If one or more predicates are included, the processor 102/execution core 10 may be configured to gate the dependency results with the predicates. That is, a dependency may remain in the results only if both the first element and the second element on which it depends are active as indicated by the associated predicate, if included (block 44). In the case of the second vector memory operation, if an element is inactive and a match is detected on an active preceding element, that match may be used to generate the dependency. The processor 102/execution core 10 may be configured to generate the result dependency vector based on the gated result (block 46), and to write the result dependency vector to the destination of the hazard check instruction (e.g. a register in the register file 12—block 48).

A result may be "gated" in the above sense of the result is selectively modified based on the active/inactive status of a corresponding vector element. In this case, for example, inactive elements may not have dependencies indicated even if the address comparison indicates a dependency. Since inactive elements will not be accessed during execution, there is no dependency at least at the current iteration of the vectorization loop. Gating the results may also be referred to as qualifying the results.

Generally, the data sizes of the two vector memory operations may differ, and they need not be aligned to the same boundary either. Accordingly, the comparison of the addresses may take into account the data sizes and may detect any overlap (partial or full) as a dependency (or may detect the addresses as matching, in the above discussion).

Macroscalar Architecture Overview

Various embodiments of an instruction set architecture (referred to as the Macroscalar Architecture) and supporting hardware may allow compilers to generate program code for loops without having to completely determine parallelism at compile-time, and without discarding useful static analysis information, will now be described. The embodiments may include the hazard check instruction described above. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 7.

Figure 7:
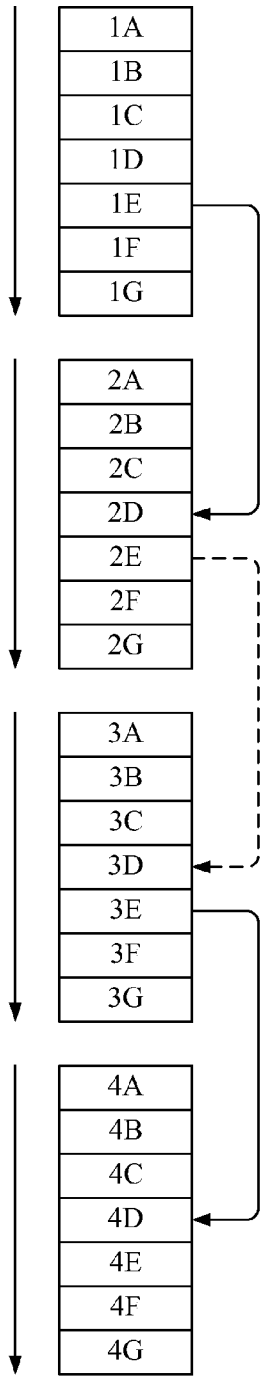
FIG. 7 is a diagram illustrating an example parallelization of a program code loop.

Referring to the left side of FIG. 7, an execution pattern is shown with four iterations (e.g., iterations 1-4) of a loop that have not been parallelized, where each loop includes instructions A-G. Serial operations are shown with instructions vertically stacked. On the right side of FIG. 7 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 7, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 7 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 may be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5;a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5;a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

--- if (FIRST( )) goto ..; // Also LAST( ), ANY( ), ALL( ), CARRY( ), ABOVE( ), or NONE( ), (where ANY( ) == !NONE( ))

---

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

---

Program Code Loop r = 0;
s = 0;
for (x=0; x<KSIZE; ++x)
{
  if (A[x] < FACTOR)
  {
    r = A[x+s];
  }
  else
  {
    s = A[x+r];
  }
  B[x] = r + s;
}

---

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=Vectorindex(Start, Increment)

Vectorindex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example: x=VectorIndex(0,1); //x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

Entry: dest={8 9 A B C D E F}
   src={1 2 3 4 5 6 7 8}
   pred={0 0 1 1 0 0 1 0}
Exit: dest={8 9 A B 4 4 E 7}
dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

Entry: src={1 2 3 4 5 6 7 8}
   pred={1 0 1 1 0 0 1 0}
Exit: dest={8 2 2 2 5 6 6 8}
dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.
kFF—Implies a loop-carried dependency from an iteration for which the predicate is false, to the subsequent iteration for which the value of the predicate is false.
kFT—Implies a loop-carried dependency from an iteration for which the predicate is false, to the subsequent iteration for which the value of the predicate is true.
kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);          // p1 = {00001100}
p2 = ConditionalStop(p1, kTF|kFT); // p2 = {00004060}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:   // i2 = {0 0 0 0 4 0 6 0}
p2 = 0;         // p2 = {0 0 0 0 0 0 0 0}
Loop2:
p2 = GeneratePredicates(p2,i2); // p2' = {1 1 1 1 0 0 0 0}
CF = 0, ZF = 0
if(!PLAST( )) goto Loop2   // p2" = {0 0 0 0 1 1 0 0}
CF = 0, ZF = 0      // p2'''= {0 0 0 0 0 0 1 1}
CF = 1, ZF = 0
```

From an initialized predicate p2 of all zeros, GeneratePredicates generates new instances of p2 that partition subsequent vector calculations into three sub-vectors (i.e., p', p", and p"'). This enables the hardware to process the vector in groups that avoid violating the data dependencies of the loop.

In FIG. 8A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 8B a diagram illustrating a progression of execution for Macroscalar vectorized program code of the loop of Example 1 is shown. In FIG. 8A and FIG. 8B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 8B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 9A and FIG. 9B, diagrams illustrating one embodiment of the vectorization of program code are shown. FIG. 9A depicts the original source code, while FIG. 9B illustrates the vectorized code representing the operations that may be performed using the Macroscalar architecture. In the vectorized code of FIG. 9B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

| Program Code Loop 1 |
|---|
| j = 0;<br>for (x=0; x<KSIZE; ++x)<br>{<br>  if (A[x] < FACTOR)<br>  {<br>    j = A[x+j];<br>  }<br>  B[x] = j;<br>} |

Example 2B

| Program Code Loop 2 |
|---|
| j = 0;<br>for (x=0; x<KSIZE; ++x)<br>{<br>  if (A[x+j] < FACTOR)<br>  {<br>    j = A[x];<br>  }<br>  B[x] = j;<br>} |

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mis-predicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

Entry: pred={0 0 1 0 1 0 0 0}
Exit: dest={0 0 0 0 0 1 1 1}

FIG. 10A and FIG. 10B are diagrams illustrating embodiments of example vectorized program code. More particularly, the code sample shown in FIG. 10A is a vectorized version of the code in Example 2A (as presented above). The code sample shown in FIG. 10B is a vectorized version of the code in Example 2B. Referring to FIG. 10B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 10A and FIG. 10B, there exists a loop-carried dependency between iterations where the condition is true, and subsequent iterations, regardless of the predicate value for the later iterations. This is reflected in the parameters of the ConditionalStop instruction.

The sample program code in FIG. 10A and FIG. 10B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

---
Program Code Loop 3
---
for (x=0; x<KSIZE; ++x)
{
  r = C[x];
  s = D[x];
  A[x] = A[r] + A[s];
}
---

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards. The CheckHazardP instruction may be an embodiment of the hazard check instruction described previously.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

Entry: first={2 3 4 5 6 7 8 9}
      second={8 7 6 5 4 3 2 1}
      pred={1 1 1 1 1 1 1 1}
   Exit: dest={0 0 0 0 3 2 1 0}

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

---
Entry Conditions:     //DIV = {0 0 0 0 3 2 1 0}
                     // p2 = {0 0 0 0 0 0 0 0}
p2 = GeneratePredicates(p2,DIV);   // p2 = {1 1 1 1 0 0 0 0}
P2 = GeneratePredicates(p2,DIV)    // p2 = {0 0 0 0 1 1 1 1}
---

The process used by the described embodiments to analyze a DIV to determine where a vector should be broken is shown in pseudocode below. In some embodiments, the vector execution unit 204 of processor 102 may perform this calculation in parallel. For example:

---
List = <empty>;
for (x=STARTPOS; x<VECLEN; ++x)
{
  if(DIV[x] in List)
    Break from loop;
  else if(DIV[x]>0)
    Append <x> to List;
}
---

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0);  //i2 = {0 0 2 0 2 4 0 0}
i3 = CheckHazardP(b,c,p0);  //i3 = {0 0 1 3 3 0 0 0}
ix = VectorMax(i2,i3);      //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 11 is a diagram illustrating one embodiment of example vectorized program code. More particularly, the code sample shown in FIG. 11 is a vectorized version of the code in Example 3 (as presented above). Referring to FIG. 11, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 11, the hazard check is performed across the entire vector of addresses. In the general case, however, it is often necessary to hazard checks between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 12 a diagram illustrating one embodiment of example vectorized program code is shown.

More particularly, the code sample shown in FIG. 12 is a vectorized Macroscalar version of the code in Example 4 (as presented above).

Example 4

Program Code Loop 4

```
j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 12, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above. The CheckHazard instruction may also be an embodiment of the hazard check instruction previously described.

Numerous variations and modifications will become apparent to those skilled in the art once the above disclosure is fully appreciated. It is intended that the following claims be interpreted to embrace all such variations and modifications.

What is claimed is:

1. A processor comprising:
an execution core configured to execute an instruction having a plurality of operands including a first base address, a second base address, and a vector, wherein the plurality of operands specify addresses corresponding to a first vector memory operation and a second vector memory operation, wherein the first vector memory operation is prior to the second vector memory operation in program order in a loop, and wherein the execution core is configured to detect whether or not a dependency exists between addresses of the first vector memory operation and addresses of the second vector memory operation responsive to the plurality of operands, and wherein the execution core is configured to generate a dependency vector in response to the instruction that indicates the detected dependencies in response to executing the instruction, wherein the execution core is configured to write the dependency vector to a result register of the instruction, and wherein the execution core is configured to use the dependency vector to predicate vector instructions in the loop to ensure that the dependencies are respected while permitting available parallelism in each iteration of the loop.

2. The processor as recited in claim 1 wherein a first plurality of addresses corresponding to the first vector memory operation are determined responsive to the first base address and elements of the vector, and wherein a second plurality of addresses corresponding to the second vector memory operation are determined responsive to the second base address and elements of the vector.

3. The processor as recited in claim 2 wherein the vector comprises offsets to the first base address and the second base address.

4. The processor as recited in claim 3 wherein the execution core is configured to scale the offsets by a first data size corresponding to the first vector memory operation to determine the first plurality of addresses, and wherein the execution core is configured to scale the offsets by a second data size corresponding to the second vector memory operation to determine the second plurality of addresses.

5. The processor as recited in claim 4 wherein the execution core is configured to add the offsets scaled by the first data size to the first base address to generate the first plurality of addresses, and wherein the execution core is configured to add the offsets scaled by the second data size to the second base address to generate the second plurality of addresses.

6. The processor as recited in claim 1 wherein the instruction further includes a first predicate corresponding to the second vector memory operation, wherein the execution core is configured to detect dependencies between elements of the first vector memory operation and elements of the second vector memory operation for which corresponding elements of the first predicate are active.

7. The processor as recited in claim 6 wherein the instruction further includes a second predicate corresponding to the first vector memory operation, wherein the execution core is configured to detect dependencies between elements of the first memory vector operation for which corresponding elements of the second predicate are active and elements of the second vector memory operation for which corresponding elements of the first predicate are active.

8. The processor as recited in claim 7 wherein the execution core is configured to detect no dependency for a first element of the first memory vector operation and a second element of the second vector memory operation responsive to either the first element or the second element being inactive as indicated by the respective second predicate or first predicate.

9. The processor as recited in claim 8 wherein the execution core is configured to detect a dependency responsive to both the first element and the second element being active as indicated by the respective second predicate and first predicate and further responsive to an overlap in the addresses of the first element and the second element.

10. The processor as recited in claim 1 wherein the dependency vector indicates, for each first element of the first vector memory operation that depends on a second element of the second vector memory operation, the element number of the second vector memory operation on which the first element depends.

11. The processor as recited in claim 10 wherein the dependency vector includes an indicator of no dependency for first elements that do not depend on second elements.

12. The processor as recited in claim 11 wherein the indicator is a value of zero.

13. A method comprising:
executing, in a processor, an instruction having a plurality of operands including a first base address, a second base address, and a vector, wherein the plurality of operands specify addresses corresponding to a first vector memory operation and a second vector memory operation, and wherein the first vector memory operation is prior to the second vector memory operation in program order in a loop;
during the executing, the processor detecting whether or not a dependency exists between addresses of the first vector memory operation and addresses of the second vector memory operation responsive to the plurality of operands;
responsive to the executing, the processor generating a dependency vector that indicates the detected dependencies in response to executing the instruction; and
the processor writing the dependency vector to a result register of the instruction, wherein the processor is configured to use the dependency vector to predicate vector instructions in the loop to ensure that the dependencies are respected while permitting available parallelism in each iteration of the loop.

14. The method as recited in claim 13 wherein a first plurality of addresses corresponding to the first memory vector operation are determined responsive to the first base address and elements of the vector, and wherein a second plurality of addresses corresponding to the second vector memory operation are determined responsive to the second base address and elements of the vector.

15. The method as recited in claim 14 wherein the vector comprises offsets to the first base address and the second base address, and the executing further comprising:
scaling the offsets by a first data size corresponding to the first vector memory operation to determine the first plurality of addresses;
scaling the offsets by a second data size corresponding to the second vector memory operation to determine the second plurality of addresses;
adding the offsets scaled by the first data size to the first base address to generate the first plurality of addresses; and
adding the offsets scaled by the second data size to the second base address to generate the second plurality of addresses.

16. The method as recited in claim 13 wherein the instruction further includes a first predicate corresponding to the second vector memory operation, wherein the detecting comprises detecting dependencies between elements of the first vector memory operation and elements of the second vector memory operation for which corresponding elements of the first predicate are active.

17. The method as recited in claim 16 wherein the instruction further includes a second predicate corresponding to the first vector memory operation, wherein the detecting comprises detecting dependencies between elements of the first vector memory operation for which corresponding elements of the second predicate are active and elements of the second vector memory operation for which corresponding elements of the second predicate are active.

18. The method as recited in claim 17 wherein the detecting is responsive to elements of both the first vector memory operation and the second vector memory operation being active as indicated by the respective second predicate and first predicate and further responsive to an overlap in the addresses of the first element and the second element.

19. The method as recited in claim 13 wherein the dependency vector indicates, for each first element of the first vector memory operation that depends on a second element of the second vector memory operation, the element number of the second vector memory operation on which the first element depends.

20. The method as recited in claim 19 wherein the dependency vector includes an indicator of no dependency for first elements that do not depend on second elements.

* * * * *